(12) United States Patent  
Kim

(10) Patent No.: US 8,743,229 B2  
(45) Date of Patent: Jun. 3, 2014

(54) IMAGE PROCESSING METHOD AND APPARATUS FOR BAYER IMAGES

(75) Inventor: Byeong-jae Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 12/873,467

(22) Filed: Sep. 1, 2010

(65) Prior Publication Data

US 2011/0063480 A1   Mar. 17, 2011

(30) Foreign Application Priority Data

Sep. 14, 2009  (KR) .................. 10-2009-0086666

(51) Int. Cl.
*H04N 5/228*  (2006.01)
*G06K 9/00*   (2006.01)
*G06K 9/36*   (2006.01)

(52) U.S. Cl.
USPC .................. 348/222.1; 382/167; 382/166

(58) Field of Classification Search
USPC .................. 348/222.1; 382/162, 166, 167
See application file for complete search history.

(56) References Cited

U.S. PATENT DOCUMENTS

| | | | |
|---|---|---|---|
| 6,882,364 B1 * | 4/2005 | Inuiya et al. | 348/252 |
| 7,092,570 B2 * | 8/2006 | Adams et al. | 382/205 |
| 2004/0170339 A1 * | 9/2004 | Maurer | 382/274 |

* cited by examiner

*Primary Examiner* — Sinh Tran  
*Assistant Examiner* — Mark Monk  
(74) *Attorney, Agent, or Firm* — Drinker Biddle & Reath LLP

(57) ABSTRACT

Provided are a method and apparatus for processing Bayer images. The Bayer image processing method including interpolating red (R), green (G), and blue (B) image signals output in Bayer patterns; converting the interpolated RGB image signals to a luminance signal and chrominance signals; correcting phases of the chrominance signals based on the luminance signal; and removing aliasing of the luminance signal and aliasing of the phase-corrected chrominance signals.

15 Claims, 6 Drawing Sheets

FIG. 3A

| $R_{i-2,j-2}$ | $G_{i-2,j-1}$ | $R_{i-2,j}$ | $G_{i-2,j+1}$ | $R_{i-2,j+2}$ |
|---|---|---|---|---|
| $G_{i-1,j-2}$ | $B_{i-1,j-1}$ | $G_{i-1,j}$ | $B_{i-1,j+1}$ | $G_{i-1,j+2}$ |
| $R_{i,j-2}$ | $G_{i,j-1}$ | $R_{i,j}$ | $G_{i,j+1}$ | $R_{i,j+2}$ |
| $G_{i+1,j-2}$ | $B_{i+1,j-1}$ | $G_{i+1,j}$ | $B_{i+1,j+1}$ | $G_{i+1,j+2}$ |
| $R_{i+2,j-2}$ | $G_{i+2,j-1}$ | $R_{i+2,j}$ | $G_{i+2,j+1}$ | $R_{i+2,j+2}$ |

FIG. 3B

| $B_{i-2,j-2}$ | $G_{i-2,j-1}$ | $B_{i-2,j}$ | $G_{i-2,j+1}$ | $R_{i-2,j+2}$ |
|---|---|---|---|---|
| $G_{i-1,j-2}$ | $R_{i-1,j-1}$ | $G_{i-1,j}$ | $R_{i-1,j+1}$ | $G_{i-1,j+2}$ |
| $B_{i,j-2}$ | $G_{i,j-1}$ | $B_{i,j}$ | $G_{i,j+1}$ | $B_{i,j+2}$ |
| $G_{i+1,j-2}$ | $R_{i+1,j-1}$ | $G_{i+1,j}$ | $R_{i+1,j+1}$ | $G_{i+1,j+2}$ |
| $B_{i+2,j-2}$ | $G_{i-2,j-1}$ | $B_{i-2,j}$ | $G_{i+2,j+1}$ | $B_{i+2,j+2}$ |

FIG. 3C

| $G_{i-2,j-2}$ | $B_{i-2,j-1}$ | $G_{i-2,j}$ | $G_{i-2,j+1}$ | $G_{i-2,j+2}$ |
|---|---|---|---|---|
| $R_{i-1,j-2}$ | $G_{i-1,j-1}$ | $R_{i-1,j}$ | $G_{i-1,j+1}$ | $R_{i-1,j+2}$ |
| $G_{i,j-2}$ | $B_{i,j-1}$ | $G_{i,j}$ | $B_{i,j+1}$ | $G_{i,j+2}$ |
| $R_{i+1,j-2}$ | $G_{i+1,j-1}$ | $R_{i+1,j}$ | $G_{i+1,j+1}$ | $R_{i+1,j+2}$ |
| $G_{i+2,j-2}$ | $B_{i-2,j-1}$ | $G_{i-2,j}$ | $B_{i+2,j+1}$ | $G_{i+2,j+2}$ |

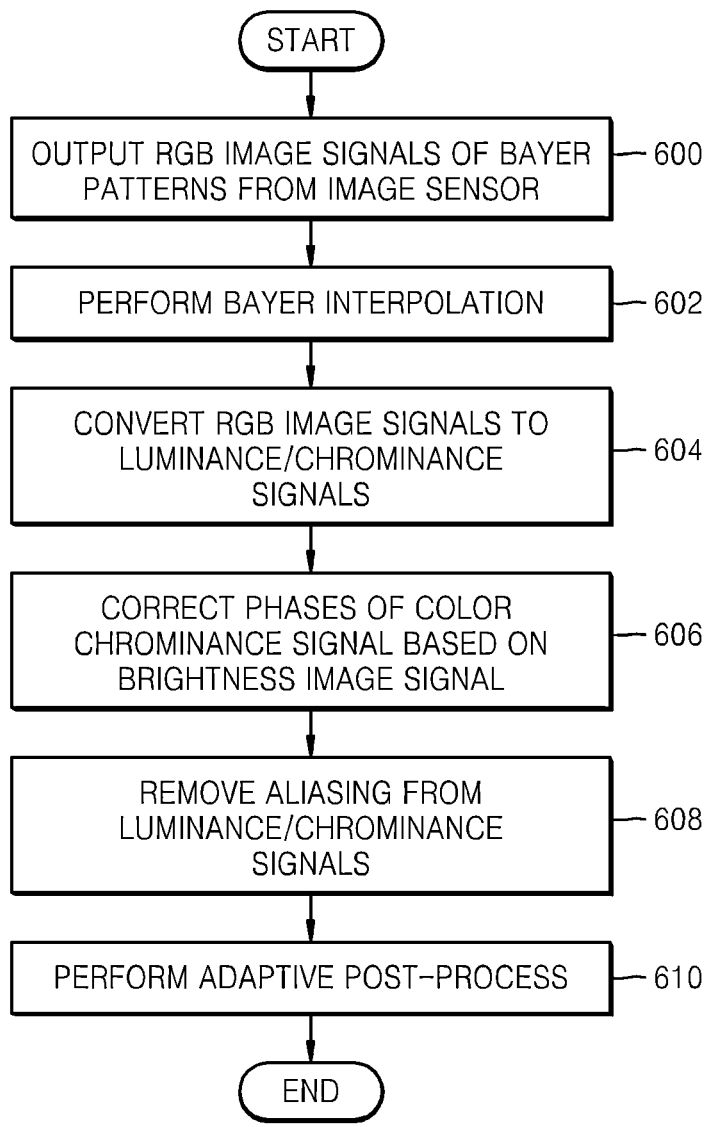

IMAGE PROCESSING METHOD AND APPARATUS FOR BAYER IMAGES

CROSS-REFERENCE TO RELATED PATENT APPLICATION

This application claims the benefit of Korean Patent Application No. 10-2009-0086666, filed on Sep. 14, 2009, in the Korean Intellectual Property Office, the entire disclosure of which is incorporated herein by reference.

BACKGROUND

1. Field of the Invention

Embodiments of the invention relate to an image processing method, and more particularly, to an image processing method and apparatus for removing aliasing from a Bayer image.

2. Description of the Related Art

Digital image processing apparatuses, including an image sensor such as a charge-coupled device (CCD) or a complementary metal-oxide semiconductor (CMOS), generally use an optical low-pass filter (OLPF) to remove high spatial frequency components from images. When a spatial frequency component, which is higher than a critical frequency in the images, is input into the digital image processing apparatuses, aliasing and a Moire pattern occurs in reproduced images. Here, the critical frequency corresponds to half the inverse number of a pixel period, and is referred to as a Nyquist frequency. An ideal OLPF removes all frequency components that are higher than the Nyquist frequency, and passes all frequency components that are lower than the Nyquist frequency.

In general, the OLPF is located in front of the CCD or the CMOS in digital cameras, digital camcorders, and surveillance cameras to remove high spatial frequency components, and thus, the aliasing and the Moire pattern are removed to improve the quality of images. However, the OLPF may be expensive and may have difficulty with reduction and pixel noise.

SUMMARY OF THE INVENTION

Therefore there is a need in the art for a Bayer image processing method including: interpolating red (R), green (G), and blue (B) image signals output in Bayer patterns; converting the interpolated RGB image signals to a luminance signal and chrominance signals; correcting phases of the chrominance signals based on the luminance signal; and removing aliasing of the luminance signal and aliasing of the phase-corrected chrominance signals.

The removing of the aliasing may be performed by a digital anti-aliasing filtering on the luminance signal and the corrected chrominance signals.

The correcting of the chrominance signals may include: calculating positions where the phases of the luminance signal and the chrominance signals do not match with each other; and correcting the chrominance signals at the calculated positions.

The correcting of the chrominance signals may include: setting a block having a predetermined size around every pixel in the luminance signal; calculating a difference between the maximum pixel value and the minimum pixel value of the pixels included in the block; and correcting a pixel value of the chrominance signal that corresponds to a center pixel of the corresponding block, which corresponds to a center pixel of the corresponding block, if the difference is greater than a predetermined value.

If the difference is equal to the predetermined critical value or greater, the pixel value of the chrominance signal corresponding to the center pixel of the corresponding block may be corrected to 0.

The removing of the aliasing may include: over-sampling the luminance signal; applying a median filter to the over-sampled luminance signal; and down-sampling the luminance signal to recover the original luminance signal.

The removing of the aliasing may further include applying a spatial low-pass filter to the corrected chrominance signal.

The method may further include applying a sharpening filter to the luminance signal and the corrected chrominance signals.

In other embodiments, there is provided a computer-readable medium encoded with a computer-executable program to perform a method comprising: interpolating red (R), green (G), and blue (B) image signals output in Bayer patterns; converting the interpolated RGB image signals to a luminance signal and chrominance signals; correcting phases of the chrominance signals based on the luminance signal; and removing aliasing of the luminance signal and aliasing of the phase-corrected chrominance signals.

In other embodiments, there is provided an image processing apparatus for a Bayer image, the apparatus including a Bayer interpolation unit configured to interpolate RGB image signals output in Bayer patterns; a color conversion unit for configured to convert the interpolated RGB signals to a luminance signal and chrominance signals; a color difference correction unit configured to correct the chrominance signals based on the luminance signal; and an aliasing removal unit configured to remove aliasing of the luminance signal and aliasing of the chrominance signals.

The aliasing removal unit may be configured to remove the aliasing by performing a digital anti-aliasing filtering on the luminance signal and the corrected chrominance signals.

The color difference correction unit may be configured to calculate positions where the phases of the luminance signal and the chrominance signals do not match with each other, and correct the chrominance signals at the calculated positions.

The color difference correction unit may include a block setting unit configured to set a predetermined block around every pixel in the luminance signal; a difference calculator configured to calculate a difference between the maximum pixel value and the minimum pixel value of the pixels included in the block; and a chrominance signal correction unit configured to correct pixel values of the chrominance signal that corresponds to the center pixel of the corresponding block, which corresponds to the center pixel of the corresponding block, if the difference is greater than a predetermined value.

The chrominance signal correction unit may be configured to correct a pixel value of the chrominance signal that corresponds to the center pixel of the corresponding block, which corresponds to the center pixel of the corresponding block, if the difference is greater than a predetermined value.

The aliasing removal unit may include an over-sampling unit configured to over-sample the luminance signal; a median filtering unit configured to apply a median filter to the over-sampled luminance signal; and a down-sampling unit configured to down-sample the luminance signal to recover the original luminance signal.

The aliasing removal unit further may include a spatial low-pass filtering unit configured to apply a spatial low-pass filter to the corrected chrominance signals.

The image processing apparatus may include an adaptive post-processing unit configured to apply a sharpening filter to the luminance signal and the corrected chrominance signals.

BRIEF DESCRIPTION OF THE DRAWINGS

The above and other features and advantages of embodiments of the invention will become more apparent by describing in detail exemplary embodiments thereof with reference to the attached drawings in which:

FIGS. 3A through 3C are diagrams showing 5×5 Bayer color filter array (CFA) patterns respectively having a red (R), a blue (B), and a green (G) center pixel (i,j);

FIG. 6 is a flowchart illustrating a Bayer image processing method according to embodiments of the invention.

DETAILED DESCRIPTION OF THE INVENTION

Figure 1:
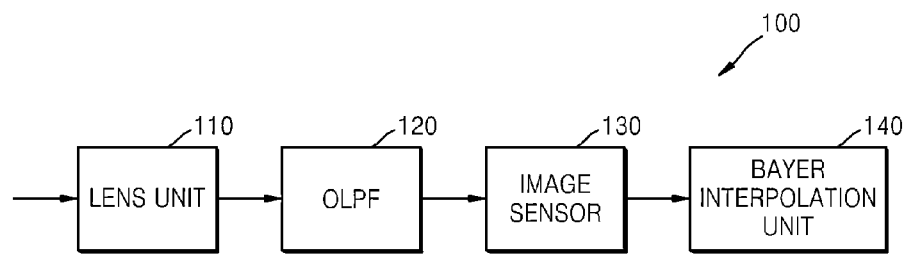
FIG. 1 is a block diagram of an image processing apparatus according to the conventional art.

Reference will now be made in detail to embodiments, examples of which are illustrated in the accompanying drawings, wherein like reference numerals refer to the like elements throughout. In this regard, embodiments may have different forms and should not be construed as being limited to the descriptions set forth herein. Accordingly, the embodiments are merely described below, by referring to the figures, to explain aspects of embodiments of the invention.

FIG. 1 is a block diagram of an image processing apparatus 100 according to the conventional art.

Referring to FIG. 1, the image processing apparatus 100 includes a lens unit 110, an optical low-pass filter (OLPF) 120, an image sensor 130, and a Bayer interpolation unit 140.

An optical signal from a subject is incident through the lens unit 110, and then, is provided to the OLPF 120. The lens unit 110 may include a zoom lens for reducing or widening a viewing angle according to a focal length or a focus lens for focusing on the subject. The optical signal passing through the lens unit 110 passes through the OLPF 120, and is focused on a light-receiving surface of the image sensor 130 to be converted into red (R), green (G), and blue (B) image signals which are electrical signals. The image sensor 130 is a single chip sensor including an image sensor such as a charge-coupled device (CCD) or a complementary metal-oxide semiconductor (CMOS). The image sensor 130 outputs a color signal among R, G, and B image signals from one pixel. The Bayer interpolation unit 140 generates three color signals with respect to one pixel by using a well-known interpolating method such as linear interpolation or bicubic interpolation.

The OLPF 120 is located in front of the image sensor 130 to remove high spatial frequency components from optical signals so as to remove aliasing and Moire patterns in images, thereby improving the quality of the image.

In the image processing apparatus 100 of the conventional art, an original optical signal passes through an anti-aliasing filter, that is, the OLPF 120, which performs as a low-pass filter, according to Nyquist sampling, and then, the optical signal is stored in a Bayer format and Bayer interpolation is performed. However, since the OLPF 120 is disposed between the lens unit 110 and the image sensor 130 in an analog section, the sharpness of the image is reduced, and expenses for the OLPF 120 are incurred. In addition, since there is a limitation in removing the aliasing in the analog section, a load is applied to the image signal process in a digital section.

Figure 2:
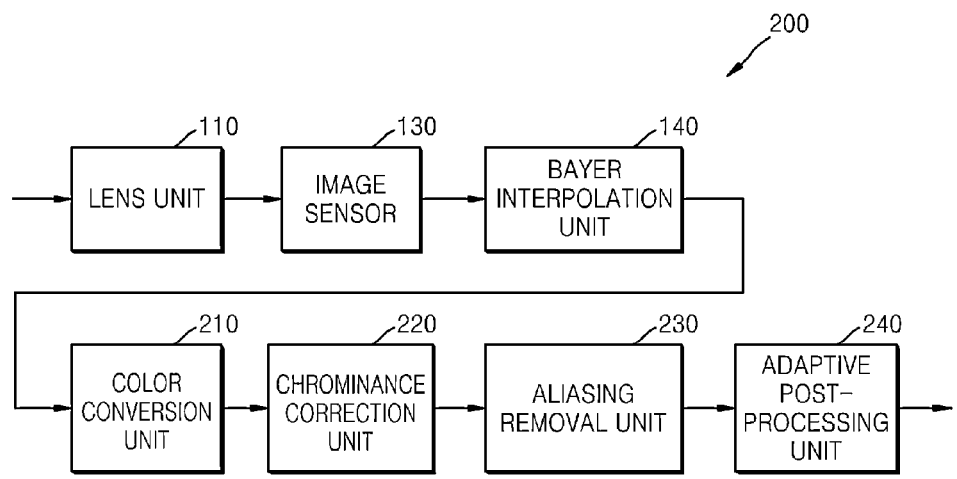
FIG. 2 is a block diagram of an image processing apparatus for Bayer images according to embodiments of the invention.

FIG. 2 is a block diagram of an image processing apparatus 200 for Bayer images according to embodiments of the invention.

Referring to FIG. 2, the image processing apparatus 200 includes a lens unit 110, an image sensor 130, a Bayer interpolation unit 140, a color conversion unit 210, a color difference correction unit 220, an aliasing removal unit 230, and an adaptive post-processing unit 240.

The image processing apparatus 200 of FIG. 2 is different from the image processing apparatus 100 of FIG. 1 in that the image processing apparatus 200 does not require the OLPF 120, but includes the color conversion unit 210, the color difference correction unit 220, the aliasing removal unit 230, and the adaptive post-processing unit 240 which are image processing modules after the Bayer interpolation unit 140. Here, the adaptive post-processing unit 240 may be selectively included in image processing apparatuses according to embodiments of the invention.

According to the image processing apparatus 200, the optical signal, after passing through the lens unit 110, does not transmit through the OLPF 120, but is directly focused on the image sensor 130 to be stored as Bayer patterns of an R image signal, a G image signal, and a B image signal and then output to the Bayer interpolation unit 140.

The Bayer interpolation unit 140 interpolates the RGB image signal output in the Bayer pattern. Here, the interpolation may be performed using a conventional interpolation method such as a mean value interpolation, a linear interpolation, or a cubic interpolation; however, embodiments of the invention are not limited thereto.

In a Bayer color filter array (CFA) pattern, half the entire pixels are green pixels, and the remaining pixels are aligned constantly as red and blue pixels. Each of the pixels in the Bayer CFA pattern is sensitive to only one color, that is, R, G, or B color. Therefore, color images obtained through the above Bayer CFA pattern are interpolated in three color channels in order to form full-color images, which is called CFA demosaicing or interpolation.

FIGS. 3A, 3B, and 3C show 5×5 Bayer patterns, each of which includes a R pixel, a B pixel, or G pixel, respectively. Referring to FIG. 3A, an unknown G pixel is estimated by using horizontal and vertical gradients in consideration of a direction of the interpolation. Likewise, in FIG. 3B, an unknown G pixel is estimated first, and in FIG. 3C, an unknown R or B pixel is estimated first.

The CFA demosaicing, that is, the CFA interpolation, is a process of unknown R, G, and B components in order to form a full-color image. In each pixel, two unknown color components are estimated using various demosaicing algorithms. A demosaicing algorithm is used to reconstruct the full-color image from incomplete data, that is, data of each pixel missing two color components, wherein the reconstruction is performed by using correlations between channels and in channels of the data, which may be used in RGB channels.

The color conversion unit 210 converts the RGB image signals interpolated in the Bayer interpolation unit 140 into luminance signals and chrominance signals. Here, since the RGB image signals are photoelectrically-converted signals that do not pass through an OLPF, aliasing exists in the RGB image signals. However, since the RGB image signals are interpolated in the Bayer interpolation unit 140, the RGB image signals may have the same information amount as that of the original image. The RGB image signals may be converted into YUV image signals according to the following Equation 1. Here, YUV is a color space representing colors by using information of a luminance signal (Y), a difference (U) between the luminance signal and blue component, and a difference (V) between the luminance signal and red component.

$$\begin{bmatrix} Y_i \\ U_i \\ V_i \end{bmatrix} = \begin{bmatrix} 0.299 & 0.587 & 0.114 \\ -0.169 & -0.331 & 0.5 \\ 0.5 & -0.419 & -0.082 \end{bmatrix} \cdot \begin{bmatrix} R_i \\ G_i \\ B_i \end{bmatrix} \quad (1)$$

where $[R_i\ G_i\ B_i]^T$ denotes R, G, and B values of an input image, $R_i$ is a signal of the red channel, $G_i$ is a signal of the green channel, and $B_i$ is a signal of the blue channel. In addition, $[Y_i\ U_i\ V_i]$ denotes Y, U, and V values converted from the input R, G, and B values, $Y_i$ denotes a luminance signal, and $U_i$ and $V_i$ respectively denote color difference signals. In embodiments, the RGB images are converted to YUV color images; however, in other embodiments the RGB images may be converted into YCbCr images.

The color difference correction unit 220 corrects the chrominance signals based on the luminance signal. The color difference correction unit 220 calculates positions where the phases of the luminance signal Y and the chrominance signals U and V do not match each other, and corrects the chrominance signals at the calculated positions. The detailed configurations and functions will be described with reference to FIG. 4.

Figure 4:
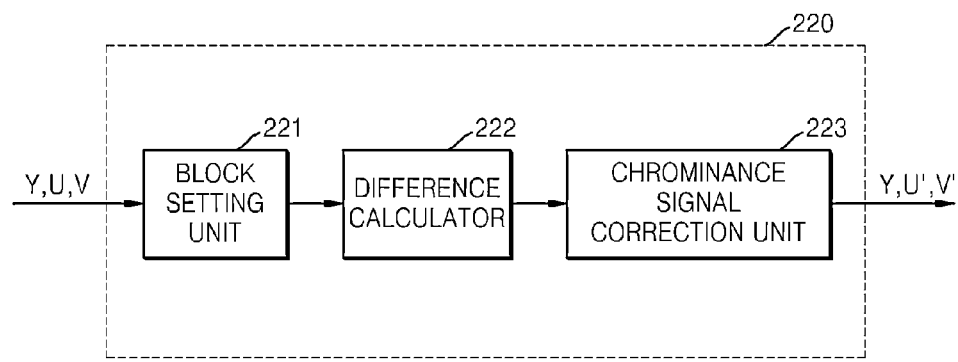
FIG. 4 is a block diagram of a color difference correction unit shown in FIG. 2.

FIG. 4 is a block diagram of the color difference correction unit 220 shown in FIG. 2.

Referring to FIG. 4, the color difference correction unit 220 includes a block setting unit 221, a difference calculator 222, and a chrominance signal correction unit 223.

The block setting unit 221 sets a block of a predetermined size based on every pixel in the luminance signal Y. Here, the size of the block may be arbitrarily determined, for example, 3×3 or 5×5, which may vary depending on the kinds of input images. That is, in the luminance signal Y, a region is set as the block having a certain size based on each of the pixels.

The difference calculator 222 calculates a difference between a maximum intensity and a minimum intensity of pixels located in the block set by the block setting unit 221. Here, the maximum is a pixel having the largest intensity in the block and the minimum is a pixel having the smallest intensity in the same block. That is, the difference between the maximum and minimum values in the corresponding block is calculated.

The chrominance signal correction unit 223 corrects pixel values of a chrominance signal U or V which is the center pixel of the corresponding block, when the difference calculated by the difference calculator 222 is equal to a predetermined critical value or greater. For example, the pixel value of the chrominance signal U or V may be replaced by 0. That is, the pixel value of the corresponding pixel is ignored, and instead, the pixel value is corrected to 0. Here, the critical value may vary depending on the kind of input image.

Therefore, the color difference correction unit 220 outputs the chrominance signals U' and V', which are obtained by correcting the chrominance signals U and V based on the luminance signal Y.

The aliasing removal unit 230 removes the aliasing in the luminance signal Y and the corrected chrominance signals U' and V'. That is, the aliasing generated because the optical signal input through the lens does not pass through the OLPF is removed. The structures and functions of the aliasing removal unit 230 will be described with reference to FIG. 5.

Figure 5:
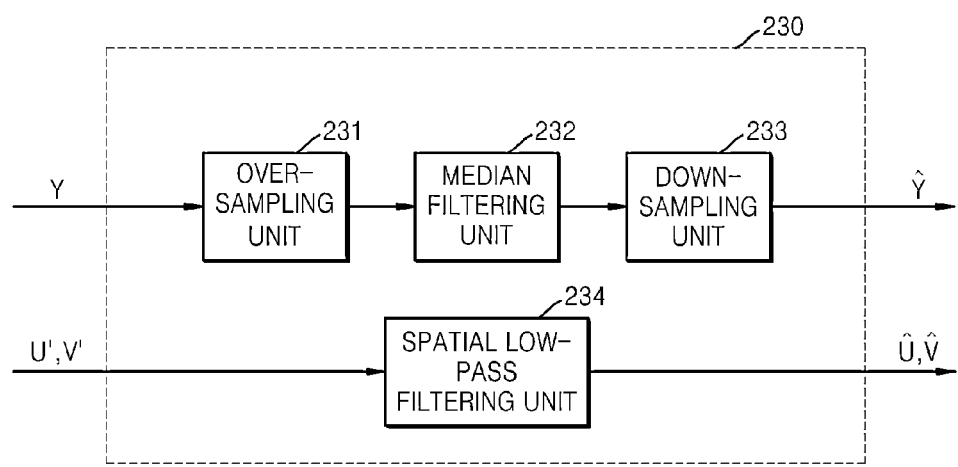
FIG. 5 is a block diagram of an aliasing removal unit shown in FIG. 2.

FIG. 5 is a block diagram of the aliasing removal unit 230 shown in FIG. 2. Referring to FIG. 5, the aliasing removal unit 230 includes an over sampling unit 231, a median filtering unit 232, a down sampling unit 233, and a spatial low-pass filtering unit 234.

The over sampling unit 231 over-samples the luminance signal Y. for example, if the luminance signal Y is an image signal having a size of 640×480, the over sampling unit 231 magnifies the luminance signal Y to a size of 1280×960, which is four times larger than the original luminance signal Y. The magnification may be set depending on the kind of input image.

The median filtering unit 232 applies a median filter to the over-sampled luminance signal Y. The median filter is a non-linear filter that is suitable for removing noise. The median filter sequentially aligns the pixel values in a region corresponding to a mask, and outputs a median of the aligned pixel values. For example, a mask having a size of 3×3, 5×5, or 7×7 may be used. Therefore, an excessively bright portion in the over-sampled luminance signal may be removed.

The down-sampling unit 233 recovers the luminance signal Y, which is filtered by the median filtering unit 232, by performing a down-sampling operation. The luminance signal Y is down-sampled to the original size of the luminance signal Y. For example, if a luminance signal Y of a brightness image having a size of 640×480 is over-sampled to a brightness image having a size of 1280×960, the luminance signal Y is down-sampled to an image having a size of 640×480 again, and then, the recovered luminance signal Y is output from the down-sampling unit 233. The luminance signal Y output from the down-sampling unit 233 is a luminance signal Y, the aliasing of which has been removed.

The spatial low-pass filtering unit 234 applies a spatial low-pass filter to the chrominance signals U' and V'. The spatial low-pass filter softens an excessively bright portion in a chrominance signal, and blurs the image to remove the aliasing in the chrominance signal.

The adaptive post-processing unit 240 applies a sharpening filter to the luminance signal $\hat{Y}$ and chrominance signals $\hat{U}$ and $\hat{V}$, the aliasing of which has been removed. The image processing apparatus 200 may selectively include the adaptive post-processing unit 240. Here, a sharpening filter sharpens the luminance signal $\hat{Y}$ and the chrominance signals $\hat{U}$ and $\hat{V}$ which are output in blurred states from the aliasing removal unit 230. A mask generally used in the sharpening filter has a positive number on a center portion and a negative number on a peripheral portion.

FIG. 6 is a flowchart illustrating a method of processing Bayer images according to embodiments of the invention.

Referring to FIG. 6, in operation 600, R, G, and B image signals of Bayer patterns are output from the image sensor 130. Here, the R, G, and B image signals do not pass through an OLPF. In operation 602, the Bayer interpolation of the R, G, and B image signals are performed. Since each of the pixels in the R, G, and B image signals output from the image sensor 130 has only one of the R, G, and B color components, the remaining two color components are estimated using an interpolation algorithm.

In operation 604, the R, G, and B image signals interpolated in operation 602 are converted into a luminance signal and chrominance signals. Here, the R, G, and B image signals are converted into YUV image signals; however, the R, G, and B image signals may be converted into YCbCr image signals.

In operation 606, the phases of the chrominance signals are corrected based on the luminance signal. That is, the pixel values of a chrominance signal, which correspond to positions on which the pixel values are rapidly change, of the luminance signal, are corrected, for example, to 0.

In operation 608, the aliasing in each of the luminance signal and the chrominance signals is removed. Here, the aliasing of the luminance signal is removed through over-sampling, median filtering, and down-sampling operations. The aliasing of the chrominance signals is removed by the spatial low-pass filtering operation.

In operation 610, adaptive post-processes are performed on the luminance signal and the chrominance signals, the aliasing of which has been removed. For example, a sharpening filter may be applied to each of the image signals to obtain clear images.

Figure 7A:
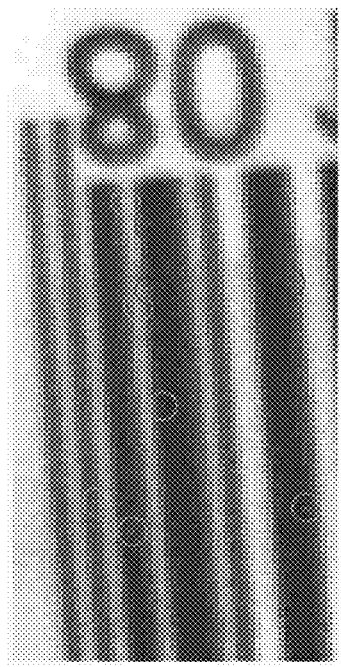
FIGS. 7A through 7C are examples for comparing image processing results according to the conventional image processing method and the Bayer image processing method of an embodiment of the invention.
Figure 7B:
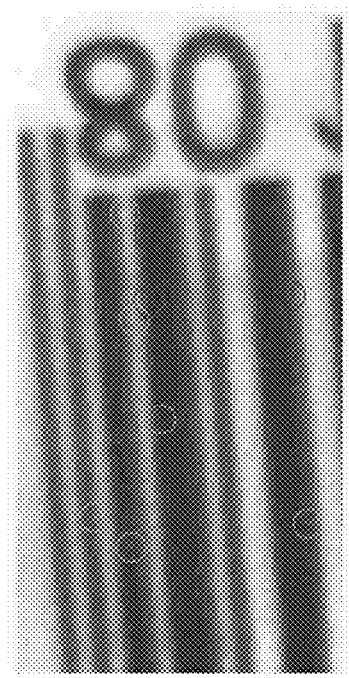
Figure 7C:
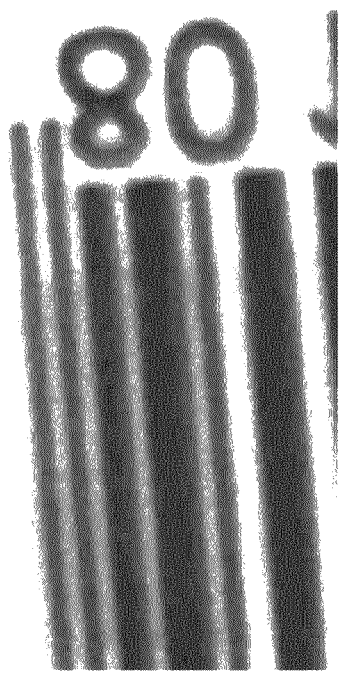

FIGS. 7A through 7C are examples for comparing image processing results according to the conventional image processing method and the Bayer image processing method of embodiments of the invention.

FIG. 7A shows an original image, FIG. 7B shows a result image according to the conventional image processing operation, and FIG. 7C is a result image of the Bayer image processing method according to embodiments of the invention. When comparing the images of FIGS. 7B and 7C with each other, the clearness of the image may be degraded and pixel noise and dynamic range may be generated when an OLPF is used, while such problems do not apply to in the image of FIG. 7C.

In addition, other embodiments of the invention can also be implemented through computer readable code/instructions in/on a medium, e.g., a computer readable medium, to control at least one processing element to implement any above described embodiments. The medium can correspond to any medium/media permitting the storage and/or transmission of the computer readable code and may be limited to physical medium.

The computer readable code can be recorded/transferred on a medium in a variety of ways, including examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the invention. The media may also be a distributed network, so that the computer readable code is stored/transferred and executed in a distributed fashion. Furthermore, the processing element could include a processor or a computer processor, and processing elements may be distributed and/or included in a single device.

According to the Bayer image processing method of embodiments of the invention, the digital aliasing removal is performed without using an OLPF, and thus, no expenses may be incurred in using the OLPF and problems such as clearness reduction and pixel noise due the OLPF may be avoided.

While embodiments the invention have been particularly shown and described with reference to exemplary embodiments thereof, it will be understood by those of ordinary skill in the art that various changes in form and details may be made therein without departing from the spirit and scope of the embodiments of the invention as defined by the following claims.

What is claimed is:

1. A Bayer image processing method comprising:
   interpolating red (R), green (G), and blue (B) image signals output in Bayer patterns;
   converting the interpolated RGB image signals to a luminance signal and chrominance signals;
   correcting phases of the chrominance signals based on the luminance signal,
   wherein the correcting of the chrominance signals is performed at pixel positions at which pixel values of the luminance signal are rapidly changing and comprises:
      calculating positions where the phases of the luminance signal and the chrominance signals do not match with each other; and
      correcting the chrominance signals at the calculated positions; and
   removing aliasing of the luminance signal and aliasing of the phase-corrected chrominance signals.

2. The method of claim 1, wherein the removing of the aliasing is performed by a digital anti-aliasing filtering on the luminance signal and the corrected chrominance signals.

3. The method of claim 1, wherein the correcting of the chrominance signals comprises:
   setting a block having a predetermined size around every pixel in the luminance signal;
   calculating a difference between the maximum pixel value and the minimum pixel value of the pixels included in the block; and
   correcting a pixel value of the chrominance signal that corresponds to a center pixel of the corresponding block, which corresponds to a center pixel of the corresponding block, if the difference is greater than a predetermined value.

4. The method of claim 3, wherein if the difference is equal to the predetermined critical value or greater, the pixel value of the chrominance signal corresponding to the center pixel of the corresponding block is corrected to 0.

5. The method of claim 4, wherein the removing of the aliasing comprises:
   over-sampling the luminance signal;
   applying a median filter to the over-sampled luminance signal; and
   down-sampling the luminance signal to recover the original luminance signal.

6. The method of claim 5, wherein the removing of the aliasing further comprises applying a spatial low-pass filter to the corrected chrominance signal.

7. The method of claim 1, further comprising applying a sharpening filter to the luminance signal and the corrected chrominance signals.

8. A non-transitory computer-readable medium encoded with a computer-executable program to perform a method comprising:
   interpolating red (R), green (G), and blue (B) image signals output in Bayer patterns;
   converting the interpolated RGB image signals to a luminance signal and chrominance signals;
   correcting phases of the chrominance signals based on the luminance signal,
   wherein the correcting of the chrominance signals is performed at pixel positions at which pixel values of the luminance signal are rapidly changing and comprises:
      calculating positions where the phases of the luminance signal and the chrominance signals do not match with each other; and
      correcting the chrominance signals at the calculated positions; and removing aliasing of the luminance signal and aliasing of the phase-corrected chrominance signals.

9. An image processing apparatus for a Bayer image, the apparatus comprising:

a Bayer interpolation unit configured to interpolate RGB image signals output in Bayer patterns;

a color conversion unit for configured to convert the interpolated RGB signals to a luminance signal and chrominance signals;

a color difference correction unit configured to correct the chrominance signals based on the luminance signal, wherein the correcting of the chrominance signals is performed at pixel positions at which pixel values of the luminance signal are rapidly changing, and wherein the color difference correction unit is configured to calculate positions where the phases of the luminance signal and the chrominance signals do not match with each other, and correct the chrominance signals at the calculated positions; and an aliasing removal unit configured to remove aliasing of the luminance signal and aliasing of the chrominance signals.

10. The apparatus of claim 9, wherein the aliasing removal unit is configured to remove the aliasing by performing a digital anti-aliasing filtering on the luminance signal and the corrected chrominance signals.

11. The apparatus of claim 9, wherein the color difference correction unit comprises:

a block setting unit configured to set a predetermined block around every pixel in the luminance signal;

a difference calculator configured to calculate a difference between the maximum pixel value and the minimum pixel value of the pixels included in the block; and a chrominance signal correction unit configured to correct pixel values of the chrominance signal that corresponds to the center pixel of the corresponding block, which corresponds to the center pixel of the corresponding block, if the difference is greater than a predetermined value.

12. The apparatus of claim 11, wherein the chrominance signal correction unit is configured to correct a pixel value of the chrominance signal that corresponds to the center pixel of the corresponding block, which corresponds to the center pixel of the corresponding block, if the difference is greater than a predetermined value.

13. The apparatus of claim 12, wherein the aliasing removal unit comprises:

an over-sampling unit configured to over-sample the luminance signal;

a median filtering unit configured to apply a median filter to the over-sampled luminance signal; and a down-sampling unit configured to down-sample the luminance signal to recover the original luminance signal.

14. The apparatus of claim 13, wherein the aliasing removal unit further comprises a spatial low-pass filtering unit configured to apply a spatial low-pass filter to the corrected chrominance signals.

15. The apparatus of claim 9, further comprising an adaptive post-processing unit configured to apply a sharpening filter to the luminance signal and the corrected chrominance signals.

* * * * *